Patented June 16, 1925.

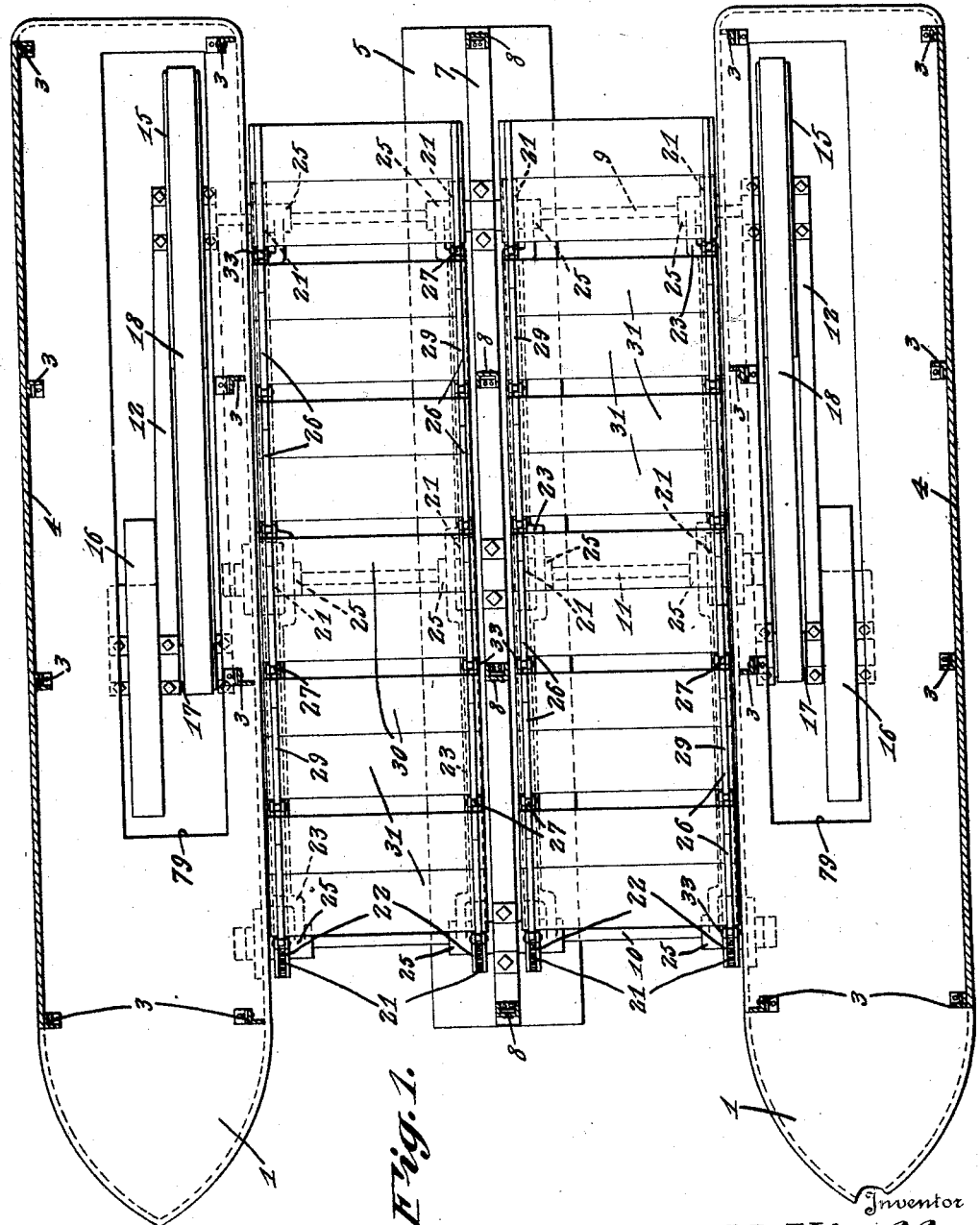

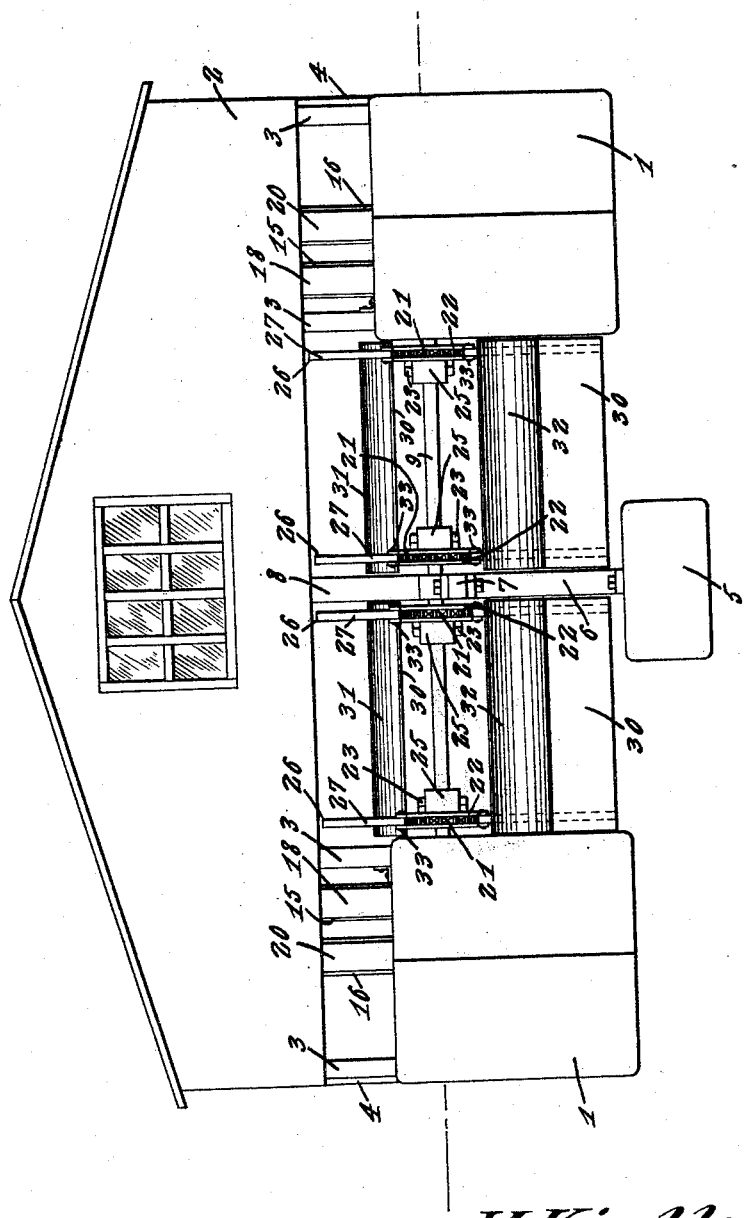

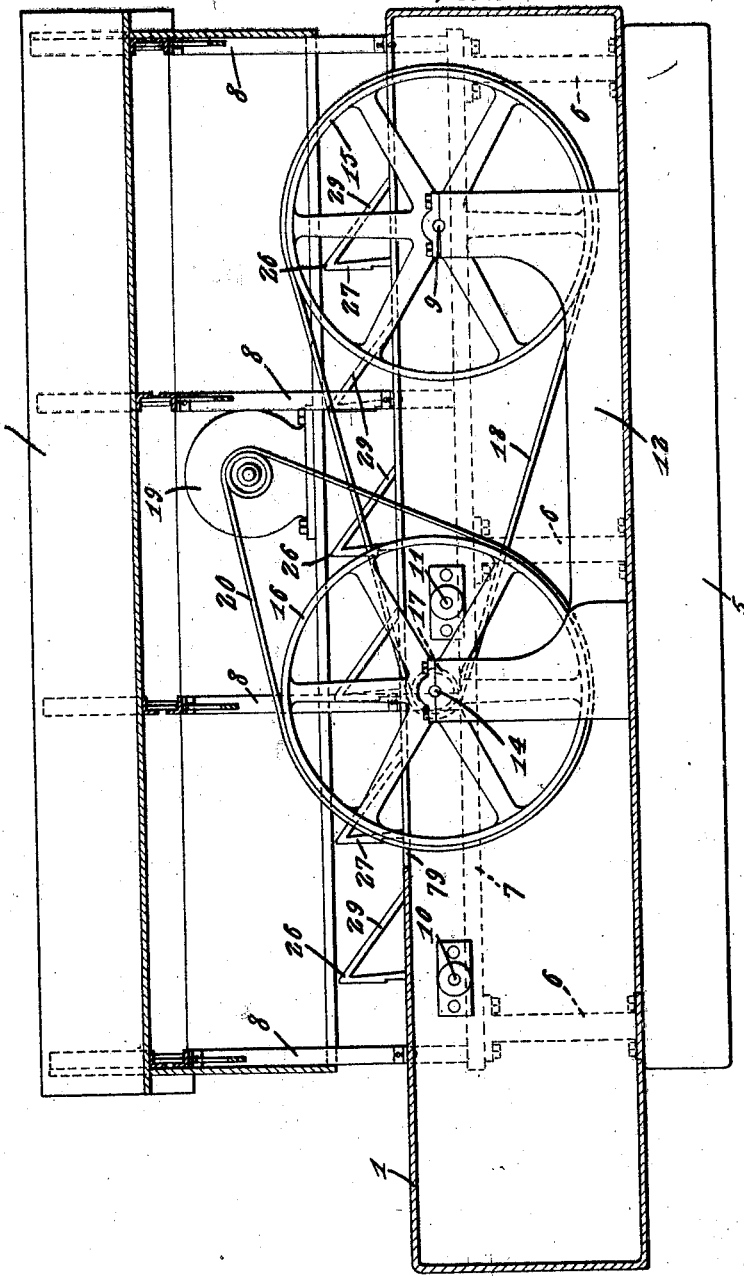

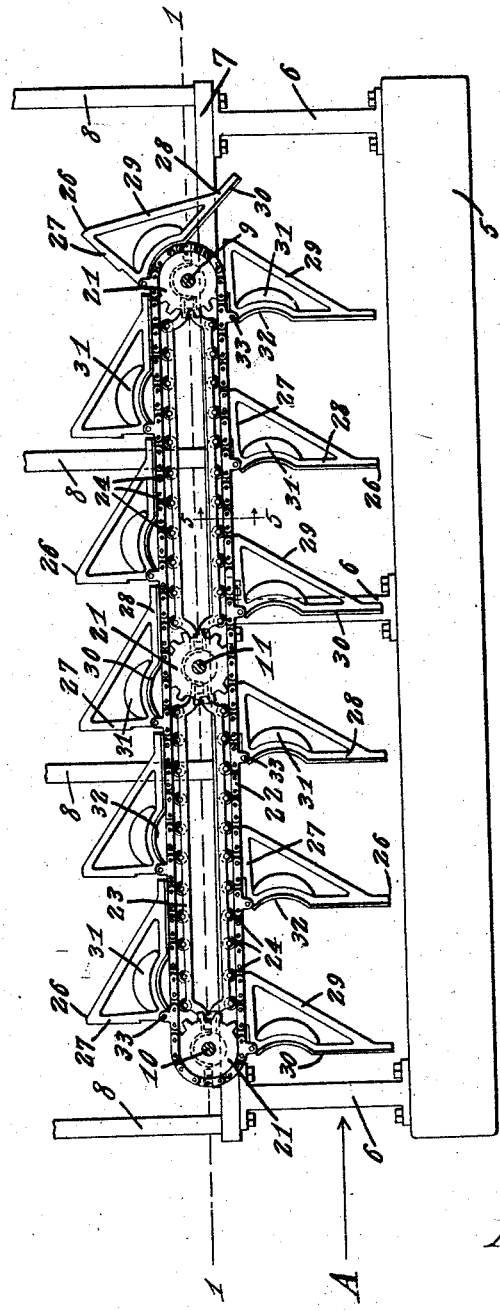

1,542,252

UNITED STATES PATENT OFFICE.

MARTIN KIMBLE, OF WASHINGTON, DISTRICT OF COLUMBIA.

TIDE AND CURRENT MOTOR.

Application filed October 25, 1921. Serial No. 510,258.

*To all whom it may concern:*

Be it known that I, MARTIN KIMBLE, a citizen of the United States, residing at Washington, District of Columbia, have invented a new and useful Tide and Current Motor, of which the following is a specification.

This invention aims to provide a simple means whereby the flowing water in a stream, or water which ebbs and flows responsive to the tide, may be used to drive machinery and to supply power generally.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in horizontal section, a device constructed in accordance with the invention, Figure 1 being, in substance, a top plan; Figure 2 is an end elevation wherein sundry elements omitted in Figure 1 are disclosed; Figure 3 is a longitudinal section taken through one of the scows and parts thereabove; Figure 4 is a fragmental vertical sectional view, in the nature of an elevation, and disclosing the intermediate float, the line 1—1 in Figure 4 indicating, approximately, the cutting plane on which Figure 1 is taken; and Figure 5 is a fragmental sectional detail on the line 5—5 of Figure 4.

In carrying out the invention, there is provided a vessel, which may be constructed as desired. Preferably, the vessel includes side floats or scows 1, above which is disposed a superstructure, in the form of a building 2, supported from the scows 1 on posts 3. Bulwarks 4 extend between the side floats or scows 1 and the building 2 and may be mounted on the outer posts 3, the bulwarks 4 preventing the wash from steamers and the like from sweeping the decks of the side floats 1.

The vessel embodies an intermediate float 5 connected by posts 6 with a support or beam 7 extended fore and aft, the support or beam 7 being connected to the superstructure 2 by posts 8. The forward end of the intermediate float 5 is set back from the forward ends of the side floats 1, to permit the water to enter readily between the floats 1.

An end shaft 9, an end shaft 10 and an intermediate shaft 11 are journaled on the support 7 and on the scows 1, the end shaft 9 being extended into the scows, adjacent to the stern thereof. The end shaft 9 is supported at its extremities, for rotation, in bearing frames 12 carried by the scows 1, as Figure 3 will disclose. Driven shafts 14 are journaled in the bearing frames 12 and in the scows 1. Pulleys 15 are carried by the shaft 9, pulleys 16 and 17 being carried by the shafts 14. Belts 18 are engaged around the pulleys 15 and 17. On the superstructure 2 is located the machinery which is to be driven, the same being represented, in the present embodiment of the invention, by a dynamo 19, connected by a belt 20 with one of the pulleys 16. In the decks of the scows 1 openings 79 are formed, these openings accommodating pulleys 15 and 16, and the belts 20.

Sprocket wheels 21 are mounted on the shafts 9, 10 and 11, sprocket chains 22 cooperating with the sprocket wheels. The sprocket chains 22 may be denominated belts coacting with the shafts 9, 10 and 11, since they operate and function as belts. Supporting bars 23, located in pairs, are provided, rollers 24 being located between the bars of each pair and being journaled thereon. The bars carry brackets 25, receiving the shafts 9, 10 and 11, and thus, the bars are supported. The rollers 24 on the supporting bars 23, engage the upper and lower runs of the sprocket chains 22, as shown in Figure 4 of the drawings.

Buckets are mounted pivotally on the sprocket chains 22. Each bucket is a composite structure, including triangular frames 26, made up of a base bar 27, a main bar 28 disposed at right angles thereto, and a brace 29 connecting the main bar with the base bar. Plates 30 extend between the main bars 28 of the frames 26. The main bars 28 of the frames 26 carry transverse floats 31. Recesses 32 are formed in the main bars 28 and in the plates 30, the recesses being located adjacent to the angles defined by the main bars 28 and the base bars 27. At the angle above alluded to, each triangular frame 26 of the bucket is pivoted at 33 to the sprocket chains 22.

When the buckets are in inactive position, that is, when they are in the positions shown in the upper portion of Figure 4, the main bars 28 of the frames 26 rest on the sprocket chains 22. When the buckets are in operative position, as shown in the lower portion of Figure 4, the base bars 27 of the frames 26 rest against the sprocket chains 22, the sprocket chains being sustained by the rollers 24 and the supporting bars 23. The buckets, therefore, are so disposed that they will receive the thrust of the flowing water, the water moving in the direction indicated by the arrow A in Figure 4. When the buckets move from the position shown in the lower portion of Figure 4 to the position shown in the upper portion of that figure, those portions of the chains 22 which are traversing the sprocket wheels on the shaft 9, are received in the recesses 32. The result is that a considerable portion of the weight of each bucket is carried directly into the said sprocket wheels, the pivotal connections 33 between the buckets and the chains being strained to a minimum extent. The floats 31 tend to elevate the lower runs of the sprocket chains 22 and prevent a sagging or a straining of the sprocket chains.

When the sprocket chains 22 are driven, from the buckets, by the action of the flowing water, motion is transmitted to the shaft 9, and from the shaft 9, by way of the pulleys 15, the belts 18 and the pulleys 17 into the shafts 14. From each shaft 14, motion is transmitted by the pulley 16 and the belt 20, to the dynamo 19 or other machine which is to be driven.

The intermediate float 5 exercises a two-fold office. First, it tends to buoy up the support or beam 7 and the shafts 9, 10 and 11, and to prevent the said shafts from sagging. Secondly, since the float 5 extends below the scows 1, as shown in Figure 2, the float acts as a keel and aids in keeping the vessel headed properly.

Having thus described the invention, what is claimed is:—

1. In a device of the class described, a vessel, shafts journaled on the vessel, a belt engaged about the shafts, buckets carried by the belt, supports mounted on and carried by the shafts, the supports extending between the shafts and connecting them, to serve as braces distributing the strain imposed by the belt and the buckets, and anti-friction devices carried by the supports and cooperating with the belt.

2. In a device of the class described, a vessel, sprocket wheels journaled on the vessel, a sprocket chain engaged with the wheels, and buckets pivoted to the chain, the buckets being provided with recesses located closely adjacent to the pivotal mountings of the buckets on the chains, the recesses being concaved to conform to the periphery of one wheel, thereby to permit the buckets to rest on said wheel throughout an appreciable portion of the periphery of the wheel, and to lessen the leverage of the buckets on the pivotal mountings of the buckets as the buckets feather upon leaving the water, and as the buckets move over said wheel and upon the upper run of the chain.

3. In a device of the class described, side floats, an intermediate float between the side floats, means for connecting the floats rigidly together, endless members located between the side floats and the intermediate float parts journaled from the side and intermediate floats and carrying the endless members, and mounted thereon, and buckets carried by the endless members, and the intermediate float extending downwardly below the plane in which the bottoms of the side floats are located, whereby the intermediate float will serve as a keel aiding in keeping the device head-on in the current, and whereby the intermediate float will tend to be buoyed up, thereby reducing the strain on the said connecting means and obviating a sagging of the shafts.

In testimony that I claim the foregoing as my own, I have hereto affixed my signature in the presence of two witnesses.

MARTIN KIMBLE.

Witnesses:
MASON B. LAWTON,
FULDA L. SEARCH.